June 7, 1927.
A. H. LEIPERT
1,631,216
NONMETALLIC CENTERING DEVICE FOR SHAFTING
Filed Nov. 19, 1923
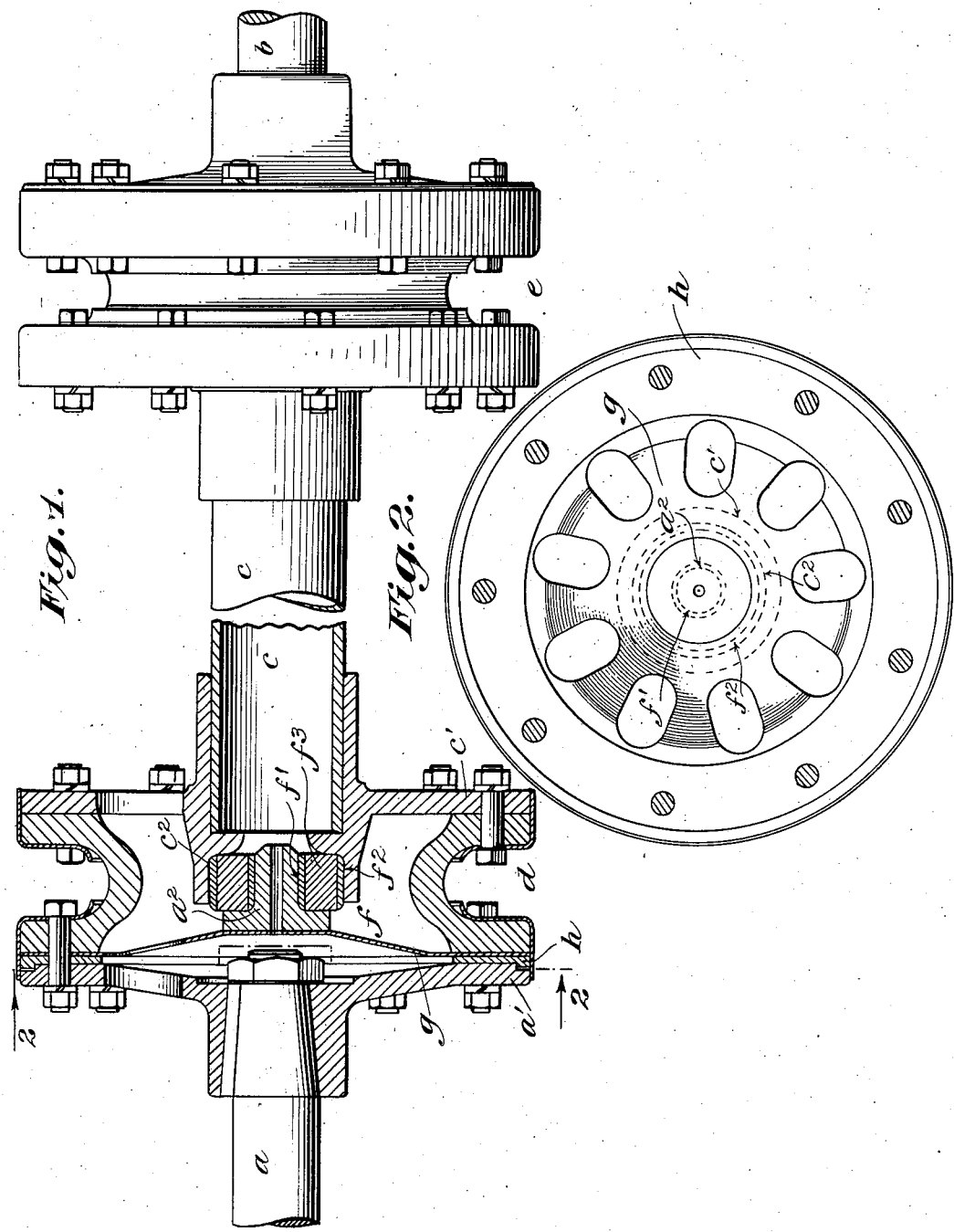
INVENTOR
August N. Leipert
BY
Redding Greeley O'Shea & Campbell
ATTORNEYS Patented June 7, 1927.

1,631,216

UNITED STATES PATENT OFFICE.

AUGUST H. LEIPERT, OF NEW YORK, N. Y., ASSIGNOR TO INTERNATIONAL MOTOR COMPANY, OF NEW YORK, N. Y., A CORPORATION OF DELAWARE.

NONMETALLIC CENTERING DEVICE FOR SHAFTING.

Application filed November 19, 1923. Serial No. 675,450.

This invention relates to a non-metallic centering device adapted for interposition between shafts which are connected for rotation with capacity for relative universal movement. The device will find its greatest usefulness in connection with universal joints of a wholly non-metallic character in which it becomes a primary desideratum to hold the axes of the interconnected shafts against lateral displacement while permitting angular movement therebetween. The principal object of the invention is to provide a centering device which shall be non-metallic and which shall perform the function of maintaining the axes in desired relationship while permitting angular movement therebetween, in and by virtue of the inherent physical properties. The improved device is itself constructed of yielding material which may be twisted internally to adapt itself to angular movements while affording sufficient mechanical stability to hold the shafts centered. Still another object of the invention is to associate with a centering device of the character described, an auxiliary yielding carrier therefor which under excess stresses may yield to afford excessive relative angular movement between the shafts. In accordance with the invention it is proposed to provide a centering device of non-metallic yielding material such as rubber which in the simplest and most inexpensive embodiment may take the form of a ring adapted to be mounted co-axially with the center line of the shafting and interposed operatively between the shafts to hold them centered relatively. The ring of rubber thus employed preferably has internal and external bearing surfaces of hard rubber engaged with the metal parts and a body of softer rubber which yields more readily in conformity with the universal movement between the connected shafts. The most convenient means for thus associating the rubber centering ring with the two shafts is to provide one of the shafts with a co-axial hub on which the ring fits and the other shaft with a co-axial recess or seat to receive a ring. If desired, the action of the ring may be supplemented by a deformable diaphragm on which the hub section may be carried, this diaphragm being adapted to distort under extreme stresses.

The invention will be more fully described in connection with the illustrated embodiment shown in the drawings, in which:

Figure 1 is a view partly in elevation and partly in section showing three shaft sections interconnected with capacity for universal movement between either two of the adjacent sections.

Figure 2 is a view in elevation showing the deformable diaphragm and taken along the line 2—2 of Figure 1 and looking in the direction of the arrows.

The invention is not limited to the precise situation in which the improved device is employed nor, indeed, to the character of the universal joint with which it is associated but for the purposes of this description there is shown a shaft $a$, a shaft $b$ and an intermediate shaft section $c$ connected to the respective shafts through universal joints $d$, $e$, which are composed of a ring of non-metallic flexible material bolted to the flange $a'$ on the shaft $a$ and the flange $c'$ on the shaft $c$ in the case shown in the sectional view and similarly interconnected in the other universal joint. Since the two joints $d$, $e$, are substantially similar and the operating conditions the same it will be sufficient to describe only the association of the improved device, with one of the joints $d$. The flange $c'$ which is carried on the shaft $c$ has formed in its ends concentrically with the axis of the shaft $c$ a recessed seat $c^2$ while the other flange $a'$ carries, by means which will be described, a hub $a^2$ which is centered with respect to the shaft $a$. The improved centering device proper comprises a ring of rubber indicated generally at $f$ having inner and outer concentric bearing surfaces $f'$, $f^2$, respectively, of hard rubber vulcanized to the central body portion $f^3$ which is more yielding. The inner bearing ring $f'$ fits snugly onto the center hub $a^2$ while the outer bearing ring $f^2$ may be forced into the seat $c^2$. The body mass $f^3$ of yielding rubber may be held somewhat under compression by means of the hard rubber rings $f'$, $f^2$, which are vulcanized thereon. From the description given it will be understood that when the parts are assembled in the intended relation the ring $f$ will yield sufficiently to afford capacity for universal movement between the shafts $a$, $c$, while holding them centered. Under extreme stresses it may be advisable to associate with the centering ring $f$ means which will flex somewhat to relieve it of the load in some degree. Such a supplemental device is shown as a diaphragm $g$ formed as a disk of sheet metal and carrying the hub $a^2$, this diaphragm being united with a carrier ring $h$ which is bolted between the joint $d$ proper and the flange $a'$. The diaphragm $g$ is deformable under excessive stresses to flex somewhat and thereby relieve the non-metallic centering ring $f$ of excessive loads.

The invention is not limited in detail to the precise character of the ring $f$ except that it is of non-metallic yielding material such as rubber. In practice, however, it is believed that this ring should be made up by vulcanizing the inner and outer hard rubber rings $f'$, $f^2$, to an intermediate softer mass of rubber $f^3$ which while having sufficient mechanical strength to do the work of centering will yield as required.

Changes in details of form and arrangement may be made without departing from the spirit of the invention.

What I claim is:—

1. As an article of manufacture a centering device for the purpose described comprising inner and outer rings of hard rubber and an intermediate ring of softer rubber vulcanized thereto whereby relative movement between the inner and outer rings is accompanied by deformation of the intermediate ring.

2. In combination with shafting and a universal connection therebetween, centering means including wholly non-metallic resilient material, means carried with the connected shafts for holding said material against displacement with respect thereto, said means on one of said shafts including a deformable element adapted to flex under predetermined stresses.

3. In combination with shafting and a universal joint therebetween, a centering device therefor including a ring of wholly non-metallic yielding material, means on one of the shafts to seat said ring concentrically therewith, a hub on the other of the shafts extending into the ring and concentric therewith, and a flexible diaphragm carried with the last named shaft to support the hub.

4. In combination with a driving shaft, a driven shaft and an intermediate shaft therebetween, universal joints comprising centering devices including, respectively, rings of wholly non-metallic yielding material, means on the intermediate shaft to seat said rings concentrically therewith, hubs on the driving and driven shafts, respectively, extending into the rings and concentric therewith, means to confine said material under compression, and a flexible diaphragm carried with the last named shafts to support the hubs.

5. In combination with a torque transmitting element comprising a universal joint between a driving and driven shaft, a centering device therefor comprising an axially disposed cylindrical stud on one shaft, an axially disposed cylindrical recess in the proximate end of the other shaft and of greater diameter than the stud, and an annulus of wholly non-metallic yielding material encircling the stud within the cylinder and whereof the peripheral surfaces are vulcanized.

6. In combination with the driving shaft and a driven shaft connected operatively therewith and having capacity to afford universal movement, centering means therefor comprising a demountable element carried with one of the shafts and adapted to flex under predetermined stresses, an axially disposed cylindrical stud mounted on said element, an axially disposed cylindrical recess on the proximate end of the other shaft and of greater diameter than the stud, and an annulus of wholly non-metallic yielding material encircling the stud within the cylinder and whereof the peripheral surfaces are vulcanized.

7. In combination, a torque transmitting element comprising a demountable element carried with one of the shafts and adapted to flex under predetermined stresses, an axially disposed cylindrical stud mounted on said element, the proximate end of the other shaft having an axially disposed cylindrical recess of greater diameter than the stud, and an annulus of wholly non-metallic yielding material encircling the stud within the cylinder and whereof the peripheral surfaces are vulcanized.

This specification signed this 16th day of November A. D. 1923.

AUGUST H. LEIPERT.